United States Patent [19]
Wilwerding

[11] 3,886,437
[45] May 27, 1975

[54] STABLE THRESHOLD CIRCUIT

[75] Inventor: Dennis J. Wilwerding, Littleton, Colo.

[73] Assignee: Honeywell Inc., Minneapolis, Minn.

[22] Filed: Aug. 6, 1973

[21] Appl. No.: 385,835

Related U.S. Application Data

[62] Division of Ser. No. 134,214, April 15, 1971, Pat. No. 3,793,556.

[52] U.S. Cl. ............... 323/8; 315/151; 315/156; 315/241 P; 323/21
[51] Int. Cl. ................................ H05b 41/36
[58] Field of Search ............ 307/252 A, 252 J, 311; 315/151, 156, 157, 158, 159, 241 P; 323/8, 19, 21, 22 SC, 38, 39, 68, 74, 81

[56] References Cited
UNITED STATES PATENTS

| | | | |
|---|---|---|---|
| 3,340,426 | 9/1967 | Elliott | 307/311 X |
| 3,395,332 | 7/1968 | Altfather | 323/74 X |
| 3,524,124 | 8/1970 | Perkinson | 323/8 X |

*Primary Examiner*—A. D. Pellinen
*Attorney, Agent, or Firm*—Arthur H. Swanson; Lockwood D. Burton; George E. Bodenstein

[57] ABSTRACT

A light control system includes a first switching member, a light sensing circuit, and a flash device. The switching member is selectively operable for providing a contact closure to effect the production of light from the flash device for the illumination of a scene to be photographed. A quench signal to effect the termination of the light provided by the flash device is generated by the light sensing circuit when sufficient light is received from the scene. The light sensing circuit includes a false quench inhibit circuit which is responsive to voltage decreases in the voltage supplied to the light sensing circuit to prevent those voltage decreases from effecting the false generation of a quench signal. Temperature compensation is also included for automatically compensating the light sensing circuit for variations in temperature, thereby precluding the generation of premature or delayed quench signals which might otherwise be caused by such variations.

1 Claim, 2 Drawing Figures

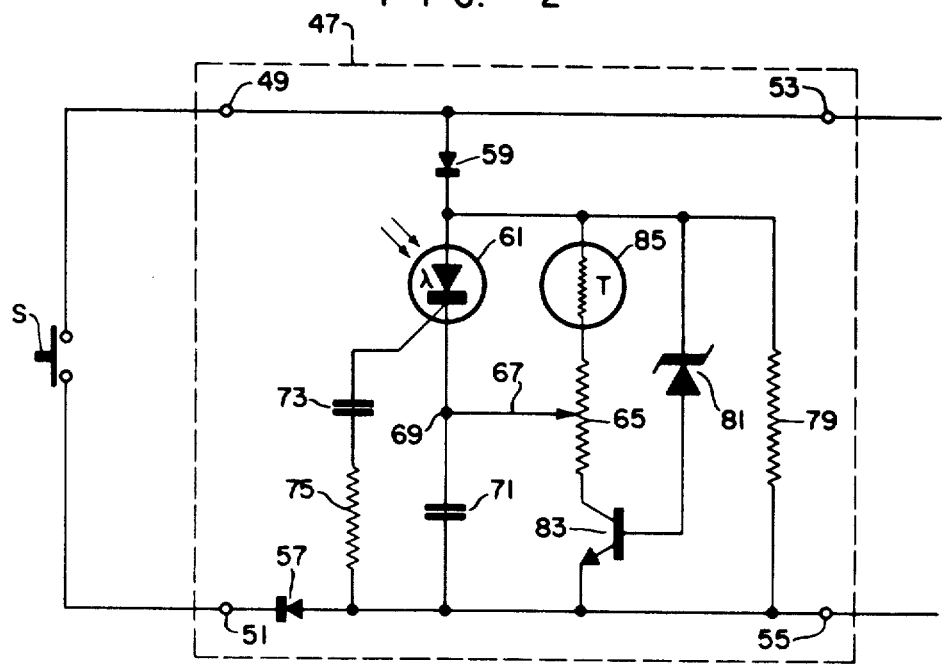

STABLE THRESHOLD CIRCUIT

This is a division of application Ser. No. 134,214, filed Apr. 15, 1971 now U.S. Pat. No. 3,793,556.

Subject matter diclosed but not claimed herein is disclosed and claimed in co-pending applications Ser. Nos. 108,878 and 108,876 of Francis T. Ogawa filed Jan. 22, 1971, and my copending applications Ser. No. 110,700 filed on Jan. 28, 1971, and Ser. No. 385,835, filed on Aug. 6, 1973.

The present invention relates generally to computer-type photo flash circuits, and more specifically to an improved light sensing means for use therein.

Electronic photographic flash systems are known in the art in which the flash of light produced by the flash unit of the system is automatically terminated by light responsive sensing means after a predetermined total quantity of light has been received fron the scene being photographed. While such sensing means have been generally satisfactory, there has still existed a need for an improved sensing means wherein the termination of the light provided by the flash unit is effected even more accurately and more reliably, under varying conditions, than has been realized through the use of prior art devices.

Specifically, there has been a possibility in some prior art sensing means to generate a false light terminating or quench signal if a decrease in the voltage supplied to the sensing means occurs subsequent to the elapsing of a substantial portion of the normal light emitting interval. Therefore, there is a need for a false quench protection circuit for use with a computer type photoflash system whereby the generation of false quench signals, which might occur as a result of such decreases in supply voltage, is prevented.

Further, prior art devices have had a liability to generate a premature light terminating or quench signal when such devices are operating at increased temperatures, and delayed or late quench signals when operating at decreased temperatures. Therefore, there is a need for an improved light sensing circuit which automatically compensates for variations in environmental temperature of light sensing means.

It is accordingly an object of the present invention to provide an improved light sensing means which fulfills the foregoing needs.

It is a further object of the present invention to provide an improved light sensing means which is non responsive to decreases in supply voltage which might otherwise be effective to produce false quench signals.

It is another object of the present invention to provide an improved light sensing means, the output characteristics of which are unimparied by variations in environmental temperature.

In accomplishing those and other objects, there has been provided in accordance with the present invention, an improved light sensing means for use in a computer type photoflash circuit. The light sensing means includes a switching means responsive to decreases in supply voltage, which might otherwise be effective to produce false quench signals, to prevent those decreases from affecting the proprer functioning of the light sensing means. A temperature compensation circuit is also included whereby variations in environmental temperature are prevented from causing premature or delayed generation of quench signals by the light sensing means.

A better understanding of the present invention may be had from the following detailed description when read in connection with the accompanying drawings in which:

FIG. 2 is a schematic diagram of a light sensing means employing one embodiment of the present invention.

Figure 1:
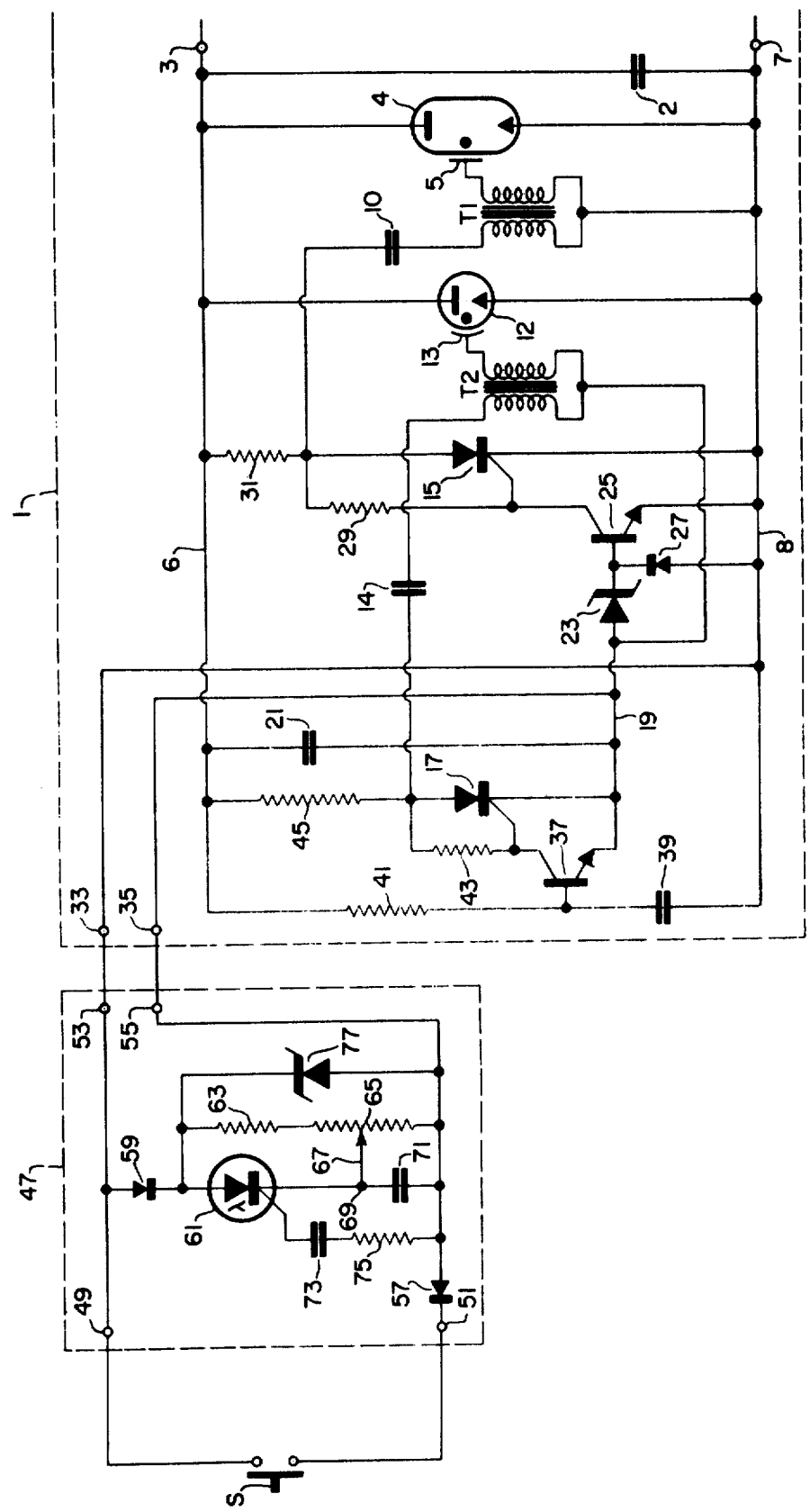
FIG. 1 is a schematic diagram of a prior art computer-type photoflash circuit.

Referring in more detail to FIG. 1, there is shown a light producing or flash unit 1 including a capacitor 2 connected between two terminals 3 and 7. The two terminals 3 and 7 are connected to the usual capacitor charging means which are not shown in FIG. 1. Such capacitor charging means are well known in the art and it is sufficient to say that the capacitor 2 is normally maintained in the charged state by the aforementioned capacitor charging means whereby a relatively high voltage is maintained across the capacitor 2. The high voltage terminal 3 is connected to a bus 6 and the terminal 7 is connected to a bus 8. A flash or light producing tube 4 is shown with its anode connected to the bus 6 and its cathode connected to the bus 8. A light triggering terminal 5 of the flashtube 4 is coupled through a transformer T1 to one terminal of a capacitor 10. The other terminal of the capacitor 10 is connected to the anode terminal of a silicon controlled rectified (SCR) 15. The common terminal of the transformer T1 is connected to the bus 8. A light terminating or quench tube 12 is shown connected between the bus 6 and the bus 8. A triggering terminal 13 of the quench tube 12 is connected through a transformer T2 to one terminal of a capacitor 14. The other terminal of the capacitor 14 is connected to the anode terminal of a second SCR 17. The common terminal of the transformer T2 is connected to a bus 19.

A capacitor 21 connects the bus 6 with the bus 19. The bus 19 is further connected to the anode of a Zener diode 23. The cathode terminal of the Zener diode 23 is connected to a common point between the base terminal of an NPN transistor 25 and the cathode terminal of a diode 27. The anode terminal of the diode 27 is connected to the common bus 8. The collector terminal of the transistor 25 is connected through a resistor 29 to the anode terminal of the SCR 15. The bus 6 is connected to the anode terminal of the SCR 15 through a resistor 31. The gate terminal of the SCR 15 is connected to the collector terminal of the transistor 25, and the cathode terminal of the SCR 15 is connected to the common bus 8. The emitter terminal of the transistor 25 is also connected to the common bus 8. An input terminal 33 of the flash device 1 is connected to the common bus 8, and the other input terminal 35 of the flash device 1 is connected to the bus 19. The bus 19 is connected to the emitter terminal of an NPN transistor 37. The base terminal of the transistor 37 is connected through a capacitor 39 to the common bus 8. The base terminal of the transistor 37 is also connected through a resistor 41 to the high voltage bus 6. The collector terminal of the transistor 37 is connected through two resistors 43 and 45 to the high voltage bus 6. The common point between the two resistors 43 and 45 is connected to the anode terminal of the SCR 17. The gate terminal of the SCR 17 is connected to the collector terminal of the transistor 37 and the cathode terminal of the SCR 17 is connected to the bus 19. A sensing means 47 has a pair of first terminals 49 and 51.

The input terminal 49 is connected directly to one terminal 53 of a pair of second terminals 53 and 55. The other input terminal 51 is connected through the cathode to anode path of the diode 57 to the other terminal 55 of the second terminals. The input terminals 49 and 51 may be connected externally to a shutter switch S of an associated camera. The input terminal 49 is connected through the anode to cathode path of a diode 59 to the anode terminal of a sensing means as, for example, a light activated silicon controlled rectifier (LASCR) 61. The anode terminal of the LASCR 61 is also connected through two resistors 63 and 65 to ther terminal 55 of the second terminals. The the resistor 65 has a slider 67 connected to a junction point 69. The point 69 is connected to the cathode terminal of the LASCR 61 and also through the capacitor 71 to the terminal 55. The gate terminal of the LASCR 61 is connected through a serial combination of a capacitor 73 and a resistor 75 to the terminal 55. The anode terminal of a Zener diode 77 is connected to the terminal 55 and its cathode terminal is connected to the anode terminal of the LASCR 61. The second terminals 53 and 55 of the sensing means 47 are connected to input terminals 33 and 35, respectively, of the flash device 1.

In operation, the capacitor 10 of the flash device 1 is charged from the high voltage bus 6 through the resistor 31. The capacitor 14 of the flash unit 1 is similarly charged from the high voltage bus 6 through the resistor 45. The transistor 37 is so biased that it is normally conducting, in a steady state condition. The transistor 25 is similarly so biased that it is normally conducting. With the transistor 37 conducting, the gate terminal of the SCR 17 is effectively clamped to its cathode terminal and the SCR 17 is therefore nonconductive. Similarly, with the transistor 25 conducting, the gate terminal of the SCR 15 is effectively clamped to its cathode terminal thereby precluding conduction. When a switching means, for example, the shutter switch S of an associated camera, provides a contact closure between the input terminals 49 and 51 of the light sensing means 47, a current flows from the bus 19 through the diode 57 to the bus 8. At that time, the LASCR 61 will still be disabled since the diode 59 is reversed biased. The voltage on the bus 19 decreases since a lower resistance path (diode 57) is now present between the buses 19 and 8 than was present before the switch S closure (Zener diode 23 and base emitter path of transmitter 25). The lower voltage on the bus 19 with respect to the bus 8 will cause the transistor 25 to turn off. With the transistor 25 non-conductive, a current will flow through the resistor 29 and into the gate terminal of the SCR 15, thereby rendering the SCR 15 conductive. With the SCR 15 conducting, the relatively low resistance path thereby effected rapidly discharges the capacitor 10. The rapid discharge of the capacitor 10 produces a trigger pulse at the flash tube terminal 5 thereby initiating the light producing function of the flash tube 4. As the flash tube 4 begins to conduct the voltage on the bus 6 is suddenly reduced as the charge on the capacitor 2 is dumped through the flash tube 4. That sudden voltage decrease on the high voltage bus 6 is coupled through the capacitor 21 to the bus 19. The coupling action of the capacitor 21 causes the voltage on the bus 19 to suddenly decrease to a negative value with respect to the voltage on the bus 8. The negative voltage on the bus 19 with respect to the voltage on the bus 8 is coupled through the sensing means 47 through the terminals 33 and 35. Initially then, the output terminal 55 of the light sensing means 47 is positive with respect to the voltage appearing at the output terminal 53, and the diode 59 will prevent conduction in the light sensing circuit since it is, at that time, reversed biased. However, as now apparent, when the flash tube 4 begins to conduct, the voltage at the output terminal 53 of the light sensing means 47 becomes positive with respect to the voltage appearing at the output terminal 55. The diode 59 will then be forward biased and allow a current to flow therethrough. The diode 57 will then be reversed biased thereby effectively disconnecting the switching means S from the light sensing means 47. The current flowing through the diode 59 flows through the resistors 63 and 65. That current establishes a voltage at the anode of the LASCR 61 which effectively powers or enables the LASCR 61. The time interval between the activation of the switching means S connecting the input terminals 49 and 51 of the light sensing means 47 and the powering of the LASCR 61 is relatively short and only momentary contact is required from the switching means S for the proper operation of the system. A portion of the current flowing through the resistor 63 flows through the slider 67 and begins to charge the capacitor 71. When the LASCR 61 is enabled, a current, representative of the amount of light received thereby, flows through its gate terminal to the integrating capacitor 73 and through the anticipation resistor 75. The instantaneous voltage appearing on the capacitor 73 represents a light controlled signal. The function of the anticipation resistor 75 is fully explained in U.S. Pat. No. 3,519,879. The capacitor 71 provides a form of dynamic anticipation in addition to the anticipation resistor 75. A time-varying threshold signal appears at the point 69 as the capacitor 71 is charged up to its steady state value. When the light controlled signal or voltage at the gate terminal of the LASCR 61 exceeds the threshold signal or voltage, and an enabling signal or voltage is present across the LASCR 61, the LASCR 61 becomes conductive. When the LASCR 61 becomes conductive a relatively lower resistance path and therefore an associated voltage decrease will appear between the output terminals 53 and 55 and accordingly between the bus 8 and the bus 19. That voltage decrease is coupled through the capacitor 39 to the base terminal of the transistor 37 thereby causing the transistor 37 to turn off. With the transistor 37 nonconducting, a current will flow into the gate terminal of the SCR 17 thereby rendering the SCR 17 conductive. When the SCR 17 becomes conductive, a lower resistance path is presented to the capaciter 14 of the flash unit 1 which causes the capacitor 14 to dump its charge. That action induces a triggering signal to appear at the quench tube triggering terminal 13 thereby initiating conduction in the quench tube 12. The rapid discharge of the capacitor 14 provides a ringing action through the circuit comprising the capacitor 14, the SCR 17 and the transformer T2. That ringing action is effective to turn off the SCR 17 after the quench tube triggering signal has been provided. After the quench tube 12 fires, the charge stored on the capacitor 2 of the flash unit 1 will dissipate to a point where the voltage on the bus 6 is insufficient to support ionization in either the quench tube 12 or the flashtube 4. The quench tube 12 and the flash tube 4 will therefore turn off. The charging circuit connected to the terminals 3 and 7 of the flash unit 1 will then begin to recharge the capacitor 2. The voltage appearing at the bus 6 will build up to a value sufficient to restore the biasing voltage required to turn the transistors 37 and 25 on and the system shown in FIG. 1 will be returned to its ready condition to await the initiation of another cycle.

The present invention is directed toward an improved sensing means including a false quench protection circuit. As hereinbefore mentioned, when the light controlled signal appearing at the gate terminal of the LASCR 61 exceeds the threshold signal appearing at the cathode terminal of the LASCR 61, and an enable signal is present across the anode and cathode terminals of the LASCR 61, the LASCR 61 becomes conductive and a trigger signal will be generated. That trigger signal is ultimately effective to trigger the quench tube 12 which thereafter effects the extinguishment of the flash in the flashtube 4. A trigger signal is generated when the LASCR 61 becomes conductive, thereby providing a relatively lower impedance path between the terminals 53 and 55 and, therefore, between the buses 8 and 19. When that relatively lower impedance path is presented between the buses 8 and 19, the potential difference therebetween also decreases. In my U.S. Pat. No. 3,706,911, a signal derived from that potential difference decrease is used to provide a visual indication to a photographer that a scene being photographed has been sufficiently illuminated to properly expose a light sensitive film in a camera. Heretofore, false trigger signals have sometimes been generated which erroneously have informed a photographer that a scene being photographed has had sufficient illumination. Those false trigger signals have occurred after the charge on the capacitor 71, which charge represents the threshold signal, has reached a steady state value. Following the attainment of a steady state value by the threshold signal appearing at the point 69, decreases in the supply voltage appearing between the terminals 53 and 55 have tended to cause the capacitor 71 to rapidly discharge through the relatively low resistance path comprising the lower portion of the resistor 65, thereby effecting a rapid decrease in the threshold signal appearing at point 69. The voltage at point 69 would tend to drop more rapidly than the voltage at the anode terminal of the LASCR 61. The voltage at the anode terminal of the LASCR 61 will decay toward its enabling voltage, i.e., the voltage below which the LASCR will not conduct even if its gate cathode junction should become forward biased. Because the decay rate of the threshold signal is faster than the decay rate of the LASCR anode voltage, the gate-cathode junction of the LASCR 61 would become forward biased before the anode voltage has decayed below its enabling voltage, and a false trigger of quench signal would result.

In addition to the generation of false trigger signals effecting a false indication that a scene being photographed has been properly illuminated, premature and late trigger signals have also been detected. Premature trigger signals will effect the extinguishment of the flashtube 4, and a "correct exposure" indication to a photographer, before a light sensitive film 2 in a camera has been properly exposed. Late trigger signals will, on the other hand, effect overexposure of the film. Both the prematurity and the lateness of the trigger signals may be traced to a temperature responsive nature of the LASCR 61. Relatively high temperatures tend to increase the amount of current generated through the gate terminal of the LASCR per unit of light, while relatively lower temperatures tend to decrease the current generation at the gate terminal for the same unit of light falling thereon. Therefore at increased temperatures the instantaneous voltage appearing at the integrating capacitor 73 would represent a greater amount of light than has actually fallen upon the light responsive junction of the LASCR 61. At decreased temperatures, the instantaneous signal appearing at the integrating capacitor 73 would represent a lesser amount of light than has actually fallen upon the LASCR 61. Premature trigger or quench signals then, would be generated at higher temperatures, and delayed trigger or quench signals would be generated at decreased temperatures.

The present invention provides greater reliability in that false quench or trigger signals are prevented, and greater accuracy by preventing premature and delayed quench or trigger signals.

One embodiment of the present invention is shown in FIG. 2 with the elements common to both FIG. 1 and FIG. 2, bearing identical numerical designations.

A sensing means 47 includes a pair of first terminals 49 and 51. The input terminal 49 is connected directly to one terminal 53 of the pair of second terminals 53 and 55. The other input terminal 51 is connected through the cathode to anode path of a diode 57 to the terminal 55. Input terminals 49 and 51 may be connected externally to a shutter switch S of an associated camera. Input terminal 49 is connected, through the anode to cathode path of a diode 59, to the anode terminal of a sensing means or light activated silicon controlled rectifier (LASCR) 61. The anode terminal of the LASCR 61 is connected to one terminal of a temperature responsive resistor 85. The other terminal of the temperature responsive resistor 85 is connected to the collector terminal of a transistor 83 through a resistor 65. The emitter terminal of the transistor 83 is connected to the terminal 55 while the base terminal of the transistor 83 is connected through the anode to cathode path of a zener diode 81 to the anode terminal of the LASCR 61. A resistor 79 connects the cathode terminal of the zener diode 81 to the emitter terminal of the transistor 83. The resistor 65 has a slider 67 connected to a junction point 69. The point 69 is connected to the cathode terminal of the LASCR 61 and also through a capacitor 71 to the terminal 55. The gate terminal of the LASCR 61 is connected through a series combination of a capacitor 73 and a resistor 75 to the terminal 55. The terminals 53 and 55 of the sensing means 47 are connected to the terminals 33 and 35 respectively of the flash unit 1 shown in FIG. 1.

The reliability of the sensing means 47 shown in FIG. 1 is greatly improved by the operational characteristics obtained through the inclusion of the resistor 79, the zener diode 81, and the transistor 83 shown in the sensing means 47 of FIG. 2. When a flash cycle is initiated, an enable signal appears at the anode terminals of the LASCR 61, and the zener diode 81 conducts in the reverse direction thereby supplying a base current to the transistor 83. The transistor 83 will then turn on and a current will flow through the resistors 85 and 65, and through the collector-to-emitter path of the transistor 83. Voltage appearing at the pick-off terminal of the resistor 65, i.e., the slider 67, determines the voltage to which the capacitor 71 will charge, thereby determining the steady state value of the threshold signal appearing at the cathode of the LASCR 61. After the threshold signal has reached its steady state value, a decrease in the supply voltage appearing at the terminals 53 and 55 will terminate the reverse conduction of the zener diode 81 and thereby turn off the transistor 83. With the transistor 83 off, the discharge path presented to the capacitor 71 will be through a discharge circuit comprising the upper portion of the resistor 65, the temperature responsive resistor 85, and the resistor 79. That discharge path causes capacitor 71 to charge toward the decaying anode voltage of LASCR 61 through the upper half of resistor 65 and resistor 85 thereby preventing the threshold signal from decaying to a value less than that of the light controlled signal before the anode to cathode voltage of the LASCR 61 has decayed below its enable voltage level. Thus, false quench or trigger signals are prevented. After the anode to cathode voltage has decayed to a value below its enable voltage level, the threshold voltage will eventually decay to a value less than the value of the light controlled signal. The gate-cathode junction of the LASCR 61 will then become forward biased, and the capacitor 73 will discharge through the same path as the capacitor 71. After the capacitor 73 is discharged, a subsequent flash cycle may be commenced as hereinbefore explained.

The accuracy of the sensing means 47 is enhanced by the addition of the temperature responsive resistor 85 in FIG. 2. As hereinbefore mentioned, at higher temperatures the current generated through the gate terminal of the LASCR 61 would be greater than that representative of the actual light received thereby, while at lower temperatures the current generated through the gate terminal of the LASCR 61 would be less than that representative of the actual light received by the LASCR 61. Assuming the presense of an enable signal, the generation of the trigger signal is effected when the voltage on the capacitor 73 exceeds the voltage on the capacitor 71 thereby forward biasing the gate cathode junction of the LASCR 61. At higher temperatures, the capacitor 73 is charged more rapidly and therefore the voltage at the capacitor 73 will exceed the voltage on the capacitor 71 sooner than normally expected, and a premature trigger or quench signal is generated. In the improved sensing means 47 shown in FIG. 2, the value of the resistance of the resistance of the temperature responsive resistor 85 decreases with increasing temperatures. Therefore, there will be a relatively smaller voltage drop across the resistor 85 and the steady state voltage appearing at the slider 67, the threshold voltage, is proportionately higher. The more rapid charging of the capacitor 73 at increased temperatures is offset by the faster charging of the capacitor 71. Accordingly, the more rapid attainment of a value exceeding that of the threshold signal is offset by the increased steady state value of the threshold signal. Conversely, at decreased temperatures, the value of the resistance of the temperature responsive resistor 85 is proportionately greater, and there will be a greater voltage drop thereacross. That effect causes a steady state voltage of proportionately lesser magnitude to appear at the slider 67 at decreased temperatures. The increased resistance of the resistor 85 causes the capacitor 71 to charge at a slower rate thereby compensating for the slower charging of the capacitor 73, and the lower steady state value of the threshold signal appearing on the capacitor 71 compensates for the less than representative rate at which the capacitor 73 charges at decreased temperatures. The effect provided by the temperature responsive resistor 85 therefore prevents the generation of premature or delayed trigger or quench signals.

Thus there has been provided an improved light sensing means including a false quench protection circuit, which prevents the generation of false quench signals which would otherwise be caused by decreases in the supply voltage, and temperature compensation means, which is effective to preclude the generation of prematured or late quench signals which would otherwise be caused by temperature variations.

The embodiments of the invention in which an exclusive property or privelege is claimed are defined as follows:

1. A circuit comprising first and second input terminals for connection to a source of supply voltage, threshold signal means for providing a threshold signal derived from said supply voltage and comprising voltage divider means having first, second, and pick-off terminals, including a first impedance means connected between said first terminal and said pick-off terminal of said voltage divider means and a second impedance means connected between said pick-off terminal and said second terminal of said voltage divider means, said first terminal of said voltage divider means being connected to said first input terminal, switching means having first, second and control terminals, said first terminal of said switching means being connected to said second terminal of said voltage divider means, and said second terminal of said switching means being connected to said second input terminal, a voltage responsive switching device connected between said first input terminal and said control terminal of said switching means, storage means connected between said pick-off terminal and said second input terminal, and third impedance means connected between said first and second input terminals, said voltage responsive switching device being responsive to said supply voltage for rendering said switching means conductive, whereby said storage means stores a charge representative of the threshold signal voltage at said pick-off terminal, said voltage responsive device being further responsive to predetermined changes in said supply voltage for rendering said switching means non-conductive, thereby substantially preventing said predetermined changes in said supply voltage from affecting the charge on said storage means.

* * * * *